United States Patent [19]
Asous

[11] Patent Number: 5,995,261
[45] Date of Patent: Nov. 30, 1999

[54] CAPACITORS ON DIELECTRIC FEEDTHRUS FOR METAL PACKAGES

[75] Inventor: Waleed A. Asous, Allentown, Pa.

[73] Assignee: Lucent Technologies Inc., Murray Hill, N.J.

[21] Appl. No.: 08/701,275

[22] Filed: Aug. 22, 1996

[51] Int. Cl.⁶ .................................................. H04B 10/00
[52] U.S. Cl. ........................... 359/163; 359/188; 257/99; 257/81; 385/92; 372/36
[58] Field of Search ..................................... 359/163, 173, 359/180, 124, 188; 257/81–82, 99; 385/92, 88; 372/36

[56] References Cited

U.S. PATENT DOCUMENTS 4,802,178  1/1989  Ury ............................................ 372/36
5,596,664  1/1997  Bostica et al. ............................. 385/92

Primary Examiner—Kinfe-Michael Negash

[57] ABSTRACT

The present invention is an Electro-Absorption-Isolated-Laser-Module (EMILM) especially adapted for use in optical communication systems, and more particularly a wavelength division multiplexed (WDM) system. The EMILM device is packaged in an industry standard housing which consists of a metal package with dielectric feedthrus which couple internal areas of the device to external pins. The device includes passive reactive elements coupled between the electrical feedthrus and the metal package which help to minimize distortion on the drive signal of the EMILM and dampen oscillations which are induced or already present.

20 Claims, 2 Drawing Sheets

CAPACITORS ON DIELECTRIC FEEDTHRUS FOR METAL PACKAGES

FIELD OF THE INVENTION

The present invention relates generally to the field of optical telecommunications devices, and more particularly to electro-optical transmitter devices for transmission of communications signals over fiber optic cables.

BACKGROUND OF THE INVENTION

Fiber-optic communication systems have been used extensively in many areas, such as, telecommunication transmission, data transmission, CATV and video transmission and distribution. More recently, wavelength division multiplexed (WDM) systems have become more important as a result of their ability to utilize the significant bandwidth of single mode fiber cables.

A WDM communication system has the ability to provide two or more communications channels over a common optical fiber, where the two or more communications channels are differentiated by optical wavelength. The use of WDM systems has recently become more prevalent in the telecommunications industry due to the escalation of bandwidth requirements for many telecommunications applications. One integral part of a WDM system is that part of an electro-optical transmitter which includes a light producing source and a modulation mechanism for the light source by which the light produced therefrom is translated or modulated into meaningful bit streams of information. Well-known transmitter devices for use in fiber optic communications systems have included LED-type transmitters as well as the more commonly used laser transmitter. One particularly advantageous device for producing modulating light signals for use in a WDM fiber optic system is termed an Electro-Absorption-Isolated-Laser-Module (EMILM).

An important parameter which characterizes the (spectral) performance of such an EMILM device in a WDM system is the dynamic wavelength movement or chirp that the device can achieve. This dynamic wavelength movement parameter is generally measured in Angstroms, where the chirp parameter produced by an ideally functioning EMILM device would be zero, i.e., no wavelength movement produced by the device.

These EMILM devices for use in WDM systems are typically packaged in industry standard housings, for example, butterfly metal packages with ceramic (dielectric) electrical feedthrus. The electrical feedthrus when combined with the body of the package will many times constitute a path whereby the electrical drive signal provided to the EMILM device becomes distorted from its originally intended shape. This distortion is undesirable as it tends to make the WDM communications signal and the channel in general less reliable, as well as negatively impacting the chirp parameter. Accordingly, there is a need for an EMILM-type-communications device which reduces the distortion of the electrical drive signal to the electro-optical device, hence producing a lower chirp.

SUMMARY OF THE INVENTION

The present invention is an Electro-Absorption-Isolated-Laser-Module (EMILM) especially adapted for use in wavelength division multiplexed (WDM) communication systems. The EMILM device is packaged in an industry standard housing which consists of a metal package with dielectric feedthrus which couple internal areas of the device to external pins. The device includes passive reactive elements coupled between the electrical feedthrus and the metal package which help to minimize distortion on the drive signal of the EMILM and dampen oscillations which are induced or already present.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Although the present invention is described in connection with an Electro-Absorption-Isolated-Laser-Module (EMILM) especially adapted for use in wavelength division multiplexed (WDM) communication systems, it would be understood that the drive signal distortion reduction scheme of the present invention may also be used with other laser-type transmission modules used in fiber optic communications systems which may include opto-electronic integrated circuits (OEICs) or photonic integrated circuits (PICs).

Figure 1:
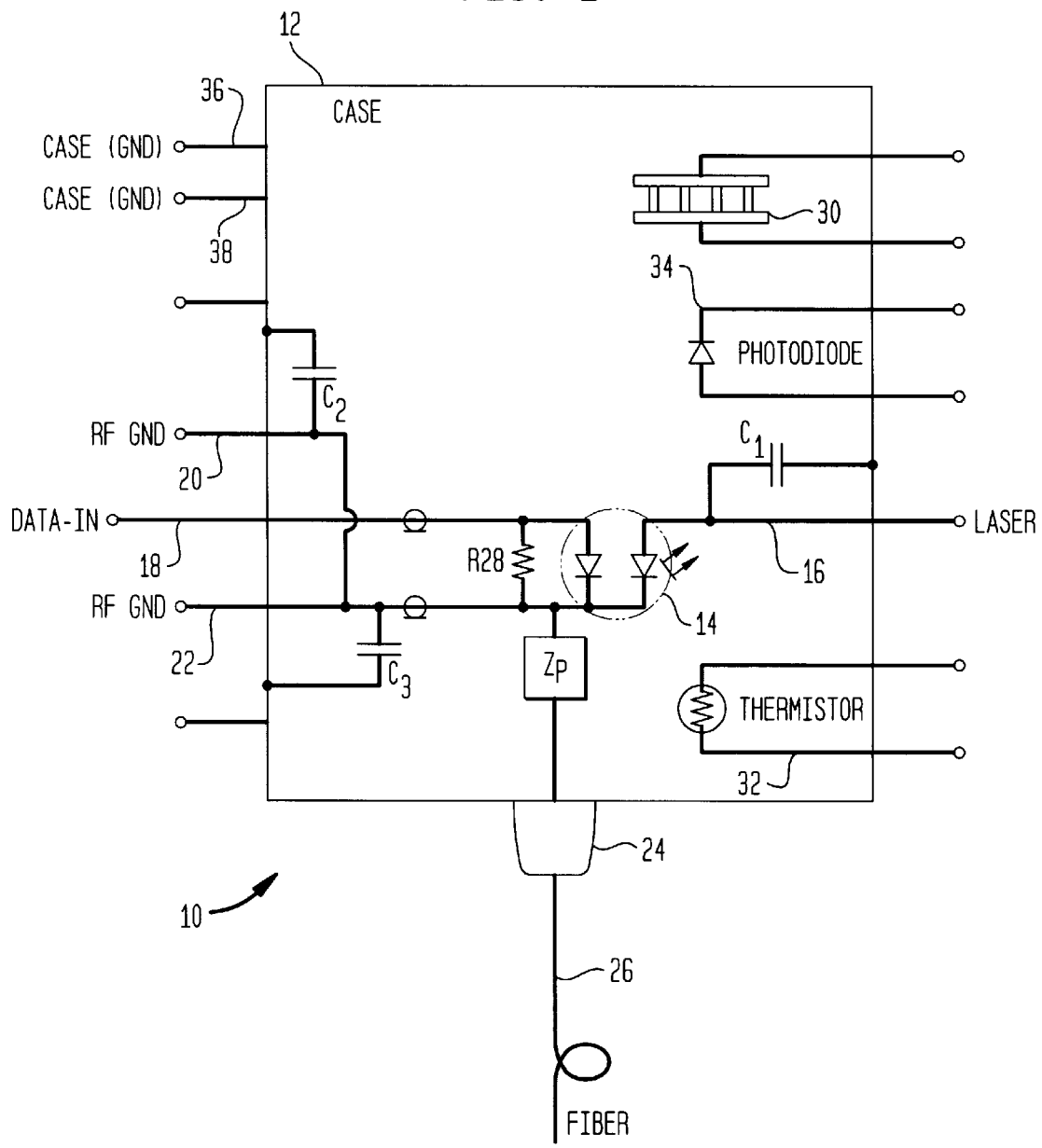
FIG. 1 shows an exemplary schematic block diagram for one embodiment of a laser module having a drive signal distortion reducing scheme in accordance with the present invention.

Referring to FIG. 1, there is shown one exemplary embodiment of a laser module device 10 in accordance with the present invention. As shown, the laser module device is an EMILM device especially adapted for use in fiber optical communications systems such as WDM systems. As with other typical laser module devices, the laser module device 10 of FIG. 1 is packaged in an industry standard housing 12 which in this case includes a 14 pin butterfly metal package. The laser module 10 includes an electro-optical light source 14, for example, one or more laser diodes, which as shown may be in the form of an EML chip or OEIC or PIC. The light source 14 is coupled to a laser (bias) terminal 16, a data-in terminal 18 and RF ground terminals 20,22, all of which terminals include separate pins extending from the housing.

As would be understood, in order for the laser module 10 to produce a modulated light output at the fiber optic output port 24, the drive voltage of the light source 14 must be effectively modulated with proper current biasing to the laser section. Typically, the laser terminal 16 is used to bias a laser light source with a current that is above the threshold of the laser diode. A modulated voltage at the data-in terminal 18 causes a variation in the output light of the light source 14. This, in turn, produces a modulated light signal which can be as high as several giga bits per second for transmission over a fiber optic cable 26. Resistor 28 is included to improve the quality of the electrical signal that is delivered to the light source 14. The impedance Zp represents the undesirable parasitic electrical paths between light source 14 and the housing 12. As would be understood, this impedance can degrade the applied signal to the light source 14 and in turn impair transmission over very long distances of fiber cable.

The laser module 10 also includes other components which are typically mounted in the same package as the laser diode. These include a thermoelectric cooler 30 which is used to maintain stable operating temperature. Another component is a thermistor 32 which controls and monitors temperature of the electro-optical device inside the case of the module. Also included is a photodiode 34 which detects light, for example, from the rear facet of the laser in order to monitor power levels. The cooler, thermistor and photodiode each include two pins on the package housing which carry signals to the rest of the transmitter circuitry. In addition to the RF ground terminals 20, 22, as shown, the module also includes first and second case ground terminals 36,38.

Figure 2:
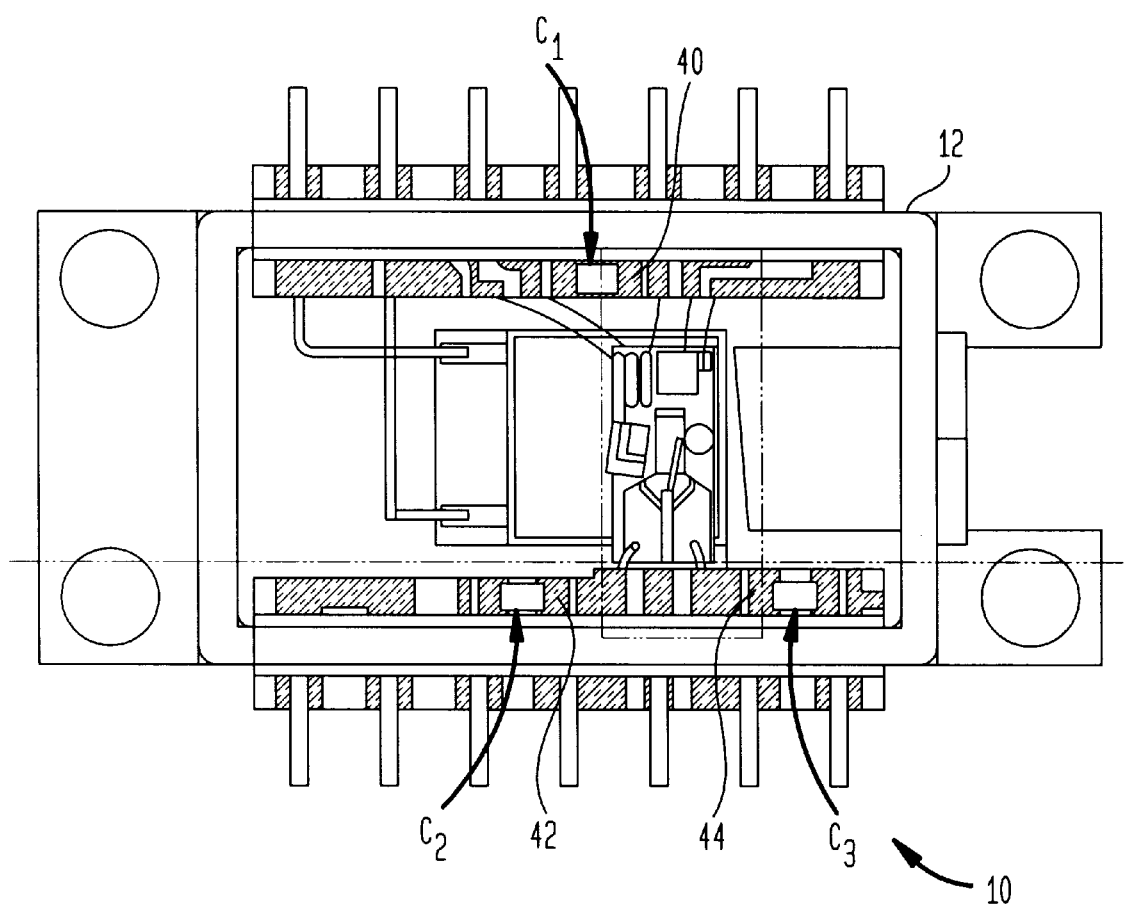
FIG. 2 shows a top view of the physical layout for one embodiment of the present invention laser module.

Referring to FIG. 2 in combination with FIG. 1, there is shown an exemplary embodiment of a physical layout for the present invention laser module 10. As shown, the housing 12 is a conductive metal case and includes dielectric electrical feedthrus 40, 42, 44 preferably made with a ceramic or other insulating material, although other comparable materials may also be used. These dielectric feedthrus couple internal components to the external pins of the laser module 10. As would be understood by a person skilled in the art, at certain locations within the device, for example, at the RF ground and data-in terminals, the dielectric feedthrus are of a coplanar or microstrip line construction having a 50-ohm characteristic impedance so as to effectively carry high frequency signals without distortion.

As noted, these dielectric feedthrus are typically used to provide signal paths to and from the laser module device 10. In laser modules of the prior art, however, some of these signal paths may constitute parasitic paths in addition to Zp whereby the provided electrical drive signal is distorted from its original intended shape. The present invention improves this distorted drive signal with the addition of passive reactive components which are coupled between the grounded metallic case package body and certain of the electrical feedthrus. The reactive components, which in one preferred embodiment are ceramic chip-type capacitors, tend to dampen the oscillations which are induced or already present on a path between the case and the feedthrus and also tend to dampen oscillations resulting from paths through the undesirable parasitic impedances. Reduction of the oscillations by means of the reactive components thereby minimizes the distortion of the drive signal.

FIGS. 1 and 2 show the preferred locations of the capacitors of the present invention in order to minimize distortion of the drive signal. As can be seen in FIG. 1, a first capacitor C1 is coupled between a laser (bias) terminal feedthru 40 and the grounded metal case of the housing 12. A second capacitor C2 is coupled between one RF ground feedthru 42 and the metal case, while a third capacitor C3 is coupled between the second RF ground feedthru 44 and the case. In one preferred embodiment the capacitors are, for example, surface mount ceramic capacitors each having capacitance values in the range of 10pF to 1.0 $\mu$F. It would be understood by a person skilled in the art that in other embodiments, the capacitors may also be embedded within the dielectric feedthrus or else integrated within the walls of the housing.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An electro-optical transmission module apparatus for producing modulated light signals for transmission over a fiber optic medium, said apparatus comprising:

an electro-optical device for producing modulated light signals in response to a data input signal, wherein said electro-optical device includes at least one RF ground terminal coupled to a corresponding external pin of said electro-optical transmission module by means of at least one dielectric feedthru;

a conductive housing for housing components of said transmission module, said conductive housing being coupled to a case ground terminal; and at least one reactive component coupled between said dielectric feedthru of said RF ground terminal and said conductive housing to thereby minimize distortions of a drive signal for said electro-optical device.

2. The apparatus of claim 1, wherein said electro-optical device further includes a biasing terminal coupled to a corresponding external pin of said electro-optical transmission module by means of a second dielectric feedthru, further including a second reactive component coupled between said second dielectric feedthru and said conductive housing.

3. The apparatus of claim 2, wherein said first and second dielectric feedthrus include ceramic material.

4. The apparatus of claim 2, wherein said first and second reactive components are capacitors.

5. The apparatus of claim 4, wherein the value of said capacitors is in the range of between 10 pF and 1.0 $\mu$F.

6. The apparatus of claim 1, wherein said electro-optical device includes a laser diode.

7. The apparatus of claim 4 wherein said first and second capacitors are embedded within said dielectric feedthrus.

8. The apparatus of claim 1, further including an output port adapted to couple to one or more fiber optic cables.

9. The apparatus of claim 1, further including a thermo-electric cooler, a thermistor device and a photo monitor diode, each being coupled to one or more corresponding external pins by dielectric feedthrus.

10. The apparatus of claim 1, wherein said electro-optical device is selected from the group consisting of EML, OEIC and PIC devices.

11. A laser module device for producing modulated light signals for transmission over a fiber optic medium, said device comprising:

a laser device for producing modulated light signals in response to a data input signal, wherein said laser device includes at least one RF ground terminal coupled to a corresponding external pin of said laser module device by means of a separate dielectric feedthru;

a conductive housing for housing components of said laser module, said conductive housing being coupled to a case ground terminal; and at least one reactive component coupled between said dielectric feedthru of said at least one RF ground terminal and said conductive housing to thereby minimize distortions of a drive signal for said laser device.

12. The device of claim 11, wherein said laser device further includes a biasing terminal coupled to a corresponding external pin of said laser module by means of a second dielectric feedthru, further including a second reactive component coupled between said second dielectric feedthru and said conductive housing.

13. The device of claim 12, wherein said first and second dielectric feedthrus include ceramic material.

14. The device of claim 12, wherein said first and second reactive components are capacitors.

15. The device of claim 14, wherein the value of said capacitors is in the range of between 10 pF and 1.0 $\mu$F.

16. The device of claim 11, wherein said photoelectric device is an ELM device and said laser module device is an Electro-Absorption-Isolated-Laser-Module.

17. The device of claim 11, wherein said laser module includes an output port adapted to couple to one or more fiber optic cables.

18. The device of claim 11, further including a thermo-electric cooler, a thermistor device and a photo monitor diode, each being coupled to one or more corresponding external pins by dielectric feedthrus.

19. The device of claim 14, wherein said capacitors are integrated within walls of said housing.

20. The device of claim 14, wherein said capacitors are embedded within said dielectric feedthrus.

* * * * *